UNITED STATES PATENT OFFICE.

JOSEPH E. BECK, OF SUNNYVALE, CALIFORNIA.

PLASTIC COMPOSITION.

1,098,216.  Specification of Letters Patent.  Patented May 26, 1914.

No Drawing.  Application filed April 16, 1913.  Serial No. 761,503.

*To all whom it may concern:*

Be it known that I, JOSEPH E. BECK, a citizen of the United States, and a resident of Sunnyvale, in the county of Santa Clara and State of California, have made certain new and useful Improvements in Plastic Compositions, of which the following is a specification.

My invention relates to plastic composition and the manufacture thereof and it consists in the composition hereinafter described in the proportions specified.

An object of my invention is to provide a plastic composition which may be used in lieu of ordinary plaster walls and ceilings, or for flooring, pavements, plaster board, shoe leather, trunks, suit cases, drums or barrels, boxes, etc.

A further object of my invention is to provide a composition of the class described having as its main ingredients materials which are found everywhere and which are relatively cheap.

A further object of my invention is to provide a plastic composition which may be used as an artificial stone since it will receive a high polish.

Other objects of my invention will appear in the following specification and the novel features of the invention will be particularly pointed out in the appended claims.

In my composition I make use of straw of any kind, rye, rice or wheat flour, chlorid of zinc and coloring matter.

In carrying out the invention I preferably proceed as follows: 1000 pounds of straw is placed in any suitable boiler containing water and to the water is added potash lye. The amount may vary, but as an example I make use of 75 pounds of lye with 1000 pounds of straw, which is placed in a tank 12 feet in diameter and 16 feet high. Steam is passed into the mixture and the straw is boiled with the lye solution from 4 to 6 hours. The lye solution is then drained off. The straw is then removed to a pulping machine and when sufficiently pulped is rinsed in running water. Part of this water is squeezed out in any suitable press, but sufficient water is left to leave the pulp in a damp state. I then add 80 pounds of rye, rice or wheat flour and 2½ gallons of a solution of chlorid of zinc, Merck's U. S. P. standard.

The composition as described above may be used as an ordinary plaster for walls or ceilings. It may be used with backing or without backing. When subjected to high pressure it will form a mass having the ability to stand a high polish by emery or sand paper.

The composition formed by the mixture of digested and pulped straw, flour and zinc chlorid may be colored with any suitable form of coloring matter, such as dyes, and may thus be made to imitate stone, such as marble, onyx, or malachite. When the composition is dry it may be polished with any suitable polishing material, such as sand paper or emery and may then be varnished.

By adding 3 quarts of linseed oil, 2 ounces of gum arabic and 2 ounces of rosin to every 10 pounds of straw pulp in dry form and subjecting the mixture to pressure in a hydraulic or other suitable press, a very durable and cheap linoleum may be made.

I claim:—

1. The herein described plastic composition which consists of a mixture of pulped straw previously digested with lye, flour and zinc chlorid.

2. The herein described plastic composition which consists of a mixture of straw digested in lye and subsequently pulped, flour, zinc chlorid and coloring matter.

3. The herein described process for producing a plastic composition which consists in boiling straw in lye solution, draining off the solution, pulping the straw, rinsing the straw with water and mixing it with flour and zinc chlorid.

JOSEPH E. BECK.

Witnesses:
 J. B. PITTS,
 E. W. PITTS.